United States Patent
Sahin et al.

(10) Patent No.: US 6,393,277 B1
(45) Date of Patent: May 21, 2002

(54) SYSTEM AND METHOD FOR IDENTIFYING A SOURCE OF INTERFERENCE IN A MOBILE TELECOMMUNICATIONS NETWORK

(75) Inventors: Yildirim Sahin, Dallas; Ali Shah, Plano; George P. Yost, DeSoto, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/374,718

(22) Filed: Aug. 13, 1999

(51) Int. Cl.[7] ................................................. H04Q 7/20
(52) U.S. Cl. ........................ 455/423; 455/63; 455/453
(58) Field of Search ........................ 455/63, 423, 424, 455/425, 453, 446, 447, 448, 449, 67-1, 67.3, 67.7, 226.1, 226.2, 226.3; 370/329, 331, 332, 130

(56) References Cited

U.S. PATENT DOCUMENTS

| | | | |
|---|---|---|---|
| 5,023,900 A | * 6/1991 | Tayloe et al. ................ 455/423 |
| 5,179,722 A | * 1/1993 | Gunmar et al. ............. 455/67.3 |
| 5,293,641 A | * 3/1994 | Kallin et al. .................. 455/63 |
| 5,491,837 A | * 2/1996 | Haartsen ....................... 455/62 |
| 5,561,839 A | * 10/1996 | Osterberg et al. ............. 455/63 |
| 5,603,092 A | * 2/1997 | Stjernholm .................... 455/63 |
| 6,240,098 B1 | * 3/1997 | Thibault et al. ............. 370/431 |
| 5,852,780 A | * 12/1998 | Wang et al. ................ 455/450 |
| 5,854,981 A | * 12/1998 | Wallstedt et al. ............ 455/439 |
| 6,041,235 A | * 3/2000 | Aalto ............................ 455/437 |
| 6,112,082 A | * 3/2000 | Almgren et al. ............. 455/425 |
| 6,091,955 A | * 7/2000 | Aalto et al. .................. 455/447 |
| 6,278,701 B1 | * 8/2001 | Ayyagari et al. ............ 370/335 |

OTHER PUBLICATIONS

Aysel Safak et al Effects of Correlated Shadowing signals on Channel Reuse in Mobile Radio System, Nov. 1991, vol. 40 No. 4, pp. 1–6.*

* cited by examiner

Primary Examiner—William Trost
Assistant Examiner—Tilahun B Gesesse
(74) Attorney, Agent, or Firm—Jenkens & Gilchrist, P.C.

(57) ABSTRACT

A method and system are disclosed for identifying one or more sources of co-channel interference within a selected cell in a mobile telecommunications network. The system includes data collecting devices which measure and store interference levels within the selected sell and traffic levels within a plurality of candidate cells, any of which may potentially contribute to the interference. The system further includes a processing element which, for each candidate cell, determines a partial correlation coefficient between the stored interference levels and the stored traffic levels for the candidate cell. The processing element additionally determines the multiple correlation coefficient between the stored interference levels and the stored traffic levels for all of the candidate cells. Based upon the partial and multiple correlation coefficients, the processing element is capable of accurately identifying the candidate cells which contribute to the co-channel interference in the selected cell.

14 Claims, 3 Drawing Sheets

SYSTEM AND METHOD FOR IDENTIFYING A SOURCE OF INTERFERENCE IN A MOBILE TELECOMMUNICATIONS NETWORK

BACKGROUND OF THE INVENTION

1. Technical Field of the Invention

The present invention relates to identifying a source of interference in a telecommunications network, and particularly identifying primary sources of uplink and downlink interference in a mobile cellular telecommunications network.

2. Background of the Invention

In cellular telephone communications systems (henceforth referred to as "cellular systems", or simply "systems"), it is important to maximize traffic-handling capacity, because the demand for such capacity continues to increase. One factor that affects capacity is the way the totality of available communication channels are allocated for use by particular cells within the system. The use of the same channel by two or more cells that are in relatively close proximity to one another can cause each cell to experience too much co-channel interference, and should therefore be avoided.

One solution for avoiding co-channel interference is to have each cell operate on a dedicated group of channels that are not used by any other cell in the system. Although this strategy successfully avoids the occurrence of co-channel interference, it limits the system's traffic-handling capacity to the number of channels that the system is permitted to use.

In order to increase the system's traffic-handling capacity, it is possible to devise a reuse plan whereby any one channel may be concurrently used by two or more cells. Co-channel interference is limited by ensuring that the one channel is allocated to cells that are geographically located far enough apart (referred to as the "reuse distance") so as not to severely interfere with one another. The appropriate distance for limiting interference will depend upon factors that affect the carrier to interference ratio (C/I) on that particular channel in each cell.

Despite a carefully devised reuse plan, co-channel interference may nonetheless occur. Co-channel interference may be on the downlink in which a mobile station in one cell receives an interfering signal transmitted by a base station in another cell towards a mobile station therein. Co-channel interference may also occur on the uplink in which a base station in one cell receives an interfering signal from a mobile station that is communicating with a signal to a base station in another cell. Because existing reuse plans reuse transmission frequencies a number times within a cellular network, co-channel interference experienced within a first cell, the "disturbed" cell, may be attributed to one or more other cells which use the same set of frequencies. There exists a need to identify those cells within a mobile cellular network which contribute to interference within a disturbed cell.

A number of methods are used to identify the contributor of interference experienced within a disturbed cell from other candidate cells in the cellular network. One technique is to turn on one possible contributor of interference at a time and drive test the disturbed cell with a test receiver. Drive testing, however, is costly with respect to both time and resource usage. In addition, due to its intrusive nature, this technique is only performed during low traffic periods, i.e., at night.

A second prior technique requires changing the voice channel assignment algorithms in an attempt to de-emphasize the influence of at least some of the candidate cells, thereby reducing the number of interfering cell candidates. This technique, however, disadvantageously requires a change in the network configuration and thus may degrade the quality of service within cells associated with the change in the voice channel assignment algorithms.

Other known techniques require extensive data collection from the disturbed cell and the candidate cells and extensive analysis of the collected data. These techniques substantially increase the amount of processing within the mobile network, which itself operates at a significantly high capacity in performing conventional telecommunication services. Noting the importance of collecting data during times of high traffic, these prior techniques have been found to overly burden the mobile telecommunications network.

Based upon the foregoing, there is a need for efficiently and accurately identifying primary contributors of interference occurring within a cell of a mobile cellular telecommunications network.

SUMMARY OF THE INVENTION

The present invention overcomes the shortcomings in prior systems and thereby satisfies a significant need for a method and system for identifying one or more primary contributors of interference within a disturbed cell in a mobile cellular telecommunications network. The identification of a primary contributor and/or cause of interference within a disturbed cell provides network planners and/or system operators an opportunity to intelligently modify the parameters by which wireless communication within one or more cells is performed.

According to a preferred embodiment of the present invention, the system includes devices for collecting data within the disturbed cell and a number of candidate cells, each of which may potentially be the cause of interference within the disturbed cell. Depending upon whether interference is experienced in uplink or downlink communication, the data collecting devices may be associated with the radio base station of the disturbed cell and each candidate cell, or with mobile stations communicating with the disturbed cell and each candidate cell. The data collection devices are adapted to measure the interference level within the disturbed cell and the level of traffic within each of the candidate cells. The interference level and traffic level measurements are collected within each of a number of sampling periods that occur at preselected times over a predetermined period of time.

The system, according to the preferred embodiment of the present invention, utilizes various statistical processes to identify those candidate cells that cause interference within the disturbed cell. For each candidate cell, the system determines the correlation between traffic utilization within the candidate cell and the level of interference within the disturbed cell. This is based upon the premise that interference within the disturbed cell is linearly dependent upon the traffic level within a cell that is a primary contributor to the interference. Candidate cells having a low correlation between interference level within the disturbed cell and traffic level within the candidate cell are dismissed as being non-contributors of interference with respect to the disturbed cell.

Because candidate cells may have comparable traffic patterns throughout the term data is collected, a candidate cell which does not actually cause interference within the disturbed cell may nonetheless relatively closely yield a high correlation between the interference level within the disturbed cell and the traffic level in the candidate cell, thereby falsely identifying the candidate cell as an interfering cell. To address this false identification, the present invention determines the correlation between the traffic levels in the various candidate cells during the period of data collection. The preferred embodiment of the present invention additionally determines complicated correlation coefficients, such as the partial correlation coefficient between the traffic level in each candidate cell and the interference level in the disturbed cell with the effects of traffic levels in the other candidate cells being removed. The preferred embodiment of the present invention further determines the multiple correlation coefficient between the interference level in the disturbed cell and the traffic levels in all of the candidate cells. Having determined the partial correlation coefficients and the multiple correlation coefficient, the preferred embodiment of the present invention is capable of identifying the candidate cells which are the primary source of interference with communications within the disturbed cell as well as the extent of contribution of each primary source candidate cell to the total interference measured in the disturbed cell.

Accordingly, the system includes processing equipment for performing the above-mentioned statistical processes on the collected data. The processing equipment performs the correlation determinations off-line in order to minimize the load on the network's resources.

The operation of the present system includes initially identifying the candidate cells, any of which may be a primary contributor of interference within the disturbed cell. Next, data is collected from each candidate cell as well as the disturbed cell during predetermined sampling intervals throughout a predetermined period of time. The collected data includes traffic level data for each candidate cell and interference level data for the disturbed cell. The collected data is then stored in a memory device accessible by the processing equipment.

Next, the processing equipment retrieves the collected data and initially prepares a covariance matrix from which is determined a simple correlation coefficient between the interference level of the disturbed cell to the traffic level in each candidate cell, and a simple correlation coefficient between the traffic levels in the candidate cells. From the simple correlation coefficients, the candidate cell which causes the most interference within the disturbed cell is obtained.

Further, the processing equipment determines for each candidate cell the partial correlation coefficient between the traffic level in the candidate cell and the interference level within the disturbed cell, with the effects of the traffic level in the other candidate cells being removed. The processing equipment then determines the multiple correlation coefficient between the interference level in the disturbed cell and the traffic levels in all of the candidate cells. Based upon the partial correlation coefficients and the multiple correlation coefficient, the processing equipment identifies the primary contributors of interfering candidate cells as well as the extent of interference contributed by each candidate cell.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
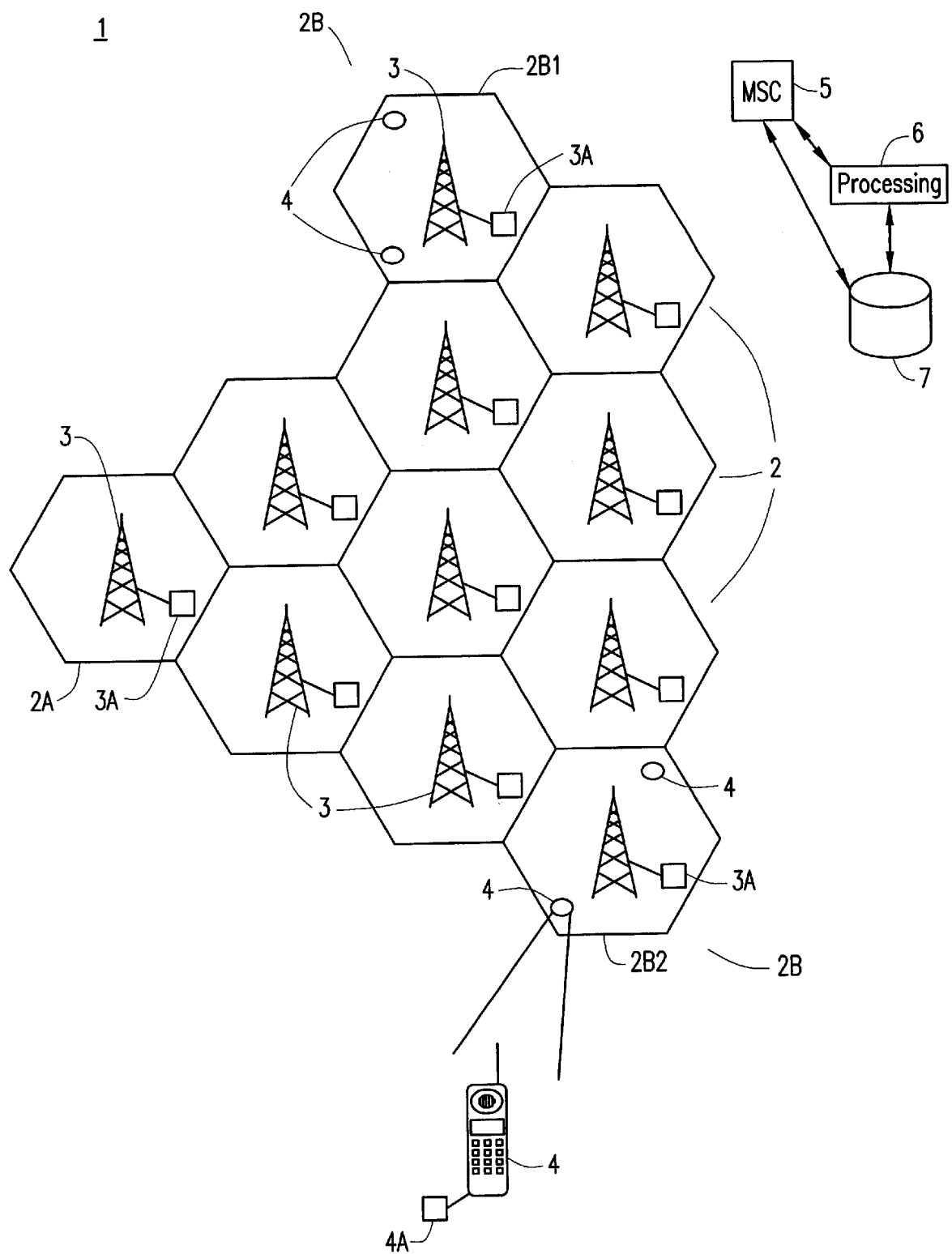
FIG. 1 is a diagram illustrating a preferred embodiment of the present invention.

Referring to FIG. 1, there is shown a telecommunications system 1 and corresponding method for identifying cells which cause interference within a cell, the disturbed cell, of a mobile cellular telecommunications network. Telecommunications system 1 is described below as a mobile cellular telecommunications system utilizing time division multiple access (TDMA) for exemplary purposes only. It is understood that telecommunications system 1 is adapted for virtually any mobile cellular network employing frequency division over which wireless communication is performed. Telecommunications system 1 may include the equipment necessary to provide wireless communication with the mobile cellular network and to identify the primary sources of interference within a selected disturbed cell in the cellular network.

The telecommunications network associated with telecommunications system 1 defines the service area in which wireless communication is provided. The service area is divided into a plurality of cells 2 (FIG. 1). For each cell in the service area, telecommunications system 1 includes a radio base station 3 (RBS) which communicates with each mobile station 4 within the cell over the air interface. A mobile switching center (MSC) S is in communication with each radio base station 3 and controls and manages the routing of communication signals in order to provide wireless communication to mobile stations 4. Each radio base station 3 is assigned a set of frequencies over which communication with mobile stations can occur. In an effort to maximize traffic-handling capacity, telecommunications system 1 assigns the same frequencies to two or more cells 2 within the network. The use of radio base stations 3 and MSC 5 to provide wireless telecommunication services and the reuse of the frequencies within the cellular network are known in the art.

It is understood that despite a carefully devised reuse plan, co-channel interference can occur wherein communication within one or more cells 2 to which a set of frequencies is assigned may cause interference with the communication within another cell 2 using the same frequencies. In order to sufficiently minimize co-channel interference within a cell 2A, called the disturbed cell, it is necessary to first determine which of a number of candidate cells 2B is a primary cause of interference within disturbed cell 2A. Telecommunications system 1 includes equipment and/or devices for identifying the primary sources of co-channel interference within disturbed cell 2A.

Specifically, telecommunications system 1 includes data collecting devices associated with each RBS 3 and mobile station 4 which collect data necessary for determining the source of co-channel interference within disturbed cell 2A. In the event interference is observed in uplink communication within disturbed cell 2A, the data collecting devices may include devices 3A located at each RBS 3 and capable of measuring the level of interference in signals received by the respective RBS 3 and the level of traffic associated therewith. In the event interference is observed in downlink communication within disturbed cell 2A, the data collecting devices may include devices 4A located at each mobile station 4 and capable of measuring the level of interference in signals thereby. In a preferred embodiment of the present invention, data collecting devices 3A and/or 4A measure interference and traffic levels during each of a number of sampling intervals. Data collecting devices 3A and/or 4A preferably measure interference in terms of the logarithm of the received power, which can be in dBm, dBw or other decibel units. Data collecting devices 3A and 4A may also compute an average interference level and an average traffic level for each set of data collected during a sampling interval.

It is understood that other suitable methods for characterizing the interference level and traffic level within a cell exist, such as techniques using a percentile filter or a finite impulse response filter. It is also understood that data collection and related data conditioning may be performed at a centralized location.

Radio base stations 3 preferably control the operation of their respective data collecting devices 3A, and mobile stations 4 preferably control the operation of their respective data collecting devices 4A. Both radio base stations 3 and mobile stations 4 may receive instructions from MSC 5 for controlling data collecting devices 3A and 4A, respectively.

Data collected by data collecting devices 3A and/or 4A is stored in a database 7 associated with MSC 5. Telecommunications system 1 preferably includes a processing element 6 having hardware and software (not shown). Processing element 6 is capable of suitably performing a number of statistical calculations for determining which candidate cells 2B are a primary and/or major source of co-channel interference within disturbed cell 2A, using the data collected by data collecting devices 3A and/or 4A and stored in database 7. Because interference within disturbed cell 2A increases with increases in the traffic level in an interfering candidate cell 2B, for each candidate cell processing element 6 determines the correlation between the amount of interference within disturbed cell 2A and the amount of traffic within the candidate cell. Correlation is defined as a measure of the linear relation between two or more variables, as is known in the art. The value of correlation is the correlation coefficient p. Those candidate cells having a low correlation coefficient p between their traffic level and the interference level within disturbed cell 2A are dismissed from consideration as potential sources of interference.

In addition, because candidate cells 2B may have similar traffic levels during the sampling intervals to the traffic levels in a candidate cell that actually causes interference within disturbed cell 2A, some candidate cells which do not contribute to the interference may have a correlation therewith that falsely indicates interference contribution. In order to distinguish interfering candidate cells from non-interfering candidate cells which have a similar correlation thereto, processing element 6 determines the simple correlation coefficients ρ between the traffic levels in the candidate cells 2B.

From the simple correlation coefficient determinations, a number of non-simple correlation coefficients are determined to identify the primary or major contributors to interference within disturbed cell 2A. For each remaining candidate cell 2B under consideration, a partial correlation coefficient $\rho_{partial}$ (i.e., the correlation of two variables while controlling or removing the linear effect of other variables) is determined between the interference level in disturbed cell 2A and the traffic level in the candidate cell 2B, with the traffic level in the other remaining candidate cells 2B being held constant or assumed to be constant. Further, the multiple correlation coefficient $\rho_{multiple}$, the cumulative effect of all variables acting on the dependent variable, is determined between the interference level within disturbed cell 2A and the traffic levels in all of the remaining candidate cells 28 under consideration. From the determinations of these non-simple correlation coefficients, processing element 6 can identify the candidate cell or cells 2B which contribute to interference within disturbed cell 2A and the extent of contribution of each interfering candidate cell 2B.

As stated above, a plurality of measurements are taken within each sampling interval from which an average measured value is determined for each sampling interval. It is noted that prior to measuring and collecting data, the duration of the sampling intervals must be determined during which interference and traffic levels are measured. The determination of the duration of the sampling intervals should be based upon two conflicting interests.

On the one hand, having a relatively long sampling interval has a greater tendency to reduce random fluctuations in measuring interference levels in disturbed cell 2A. The particular position of the mobile stations 4 located within the candidate cells 2B (i.e., the mobile stations 4 which potentially generate the interference within disturbed cell 2A on the uplink) affects the interference level within disturbed cell 2A. This is due to the fact that the proximity of the mobile stations 4 within candidate cells 2B to RBS 3 of disturbed cell 2A and the terrain therebetween impact the extent of interference, if any, within disturbed cell 2A. By providing a wider sampling interval during which a greater number of measurements may be made, the effect of individual communications by mobile stations 4 on the interference level and/or the random fluctuations in the interference level is reduced.

On the other hand, a shortened sampling interval is desired in order to increase the random fluctuations between measured traffic levels in candidate cells 2B. This best assures different measured interference levels between candidate cells 2B. As a result, a non-interfering candidate cell 2B will be less likely to be falsely identified as an interfering cell because the correlation between the measured traffic level in the non-interfering candidate cell 2B and the traffic level in an interfering candidate cell 2B will be reduced.

Based upon the foregoing, the duration of the sampling interval should be chosen taking into consideration the above-identified conflicting interests.

The time period during which the sampling intervals are to occur must also be determined. The time period should be chosen so that the sampling intervals occur during both peak and off-peak hours so as to give a wide range of traffic utilizations in the candidate cells which allows a better determination of the correlation between traffic and interference.

Figure 2:
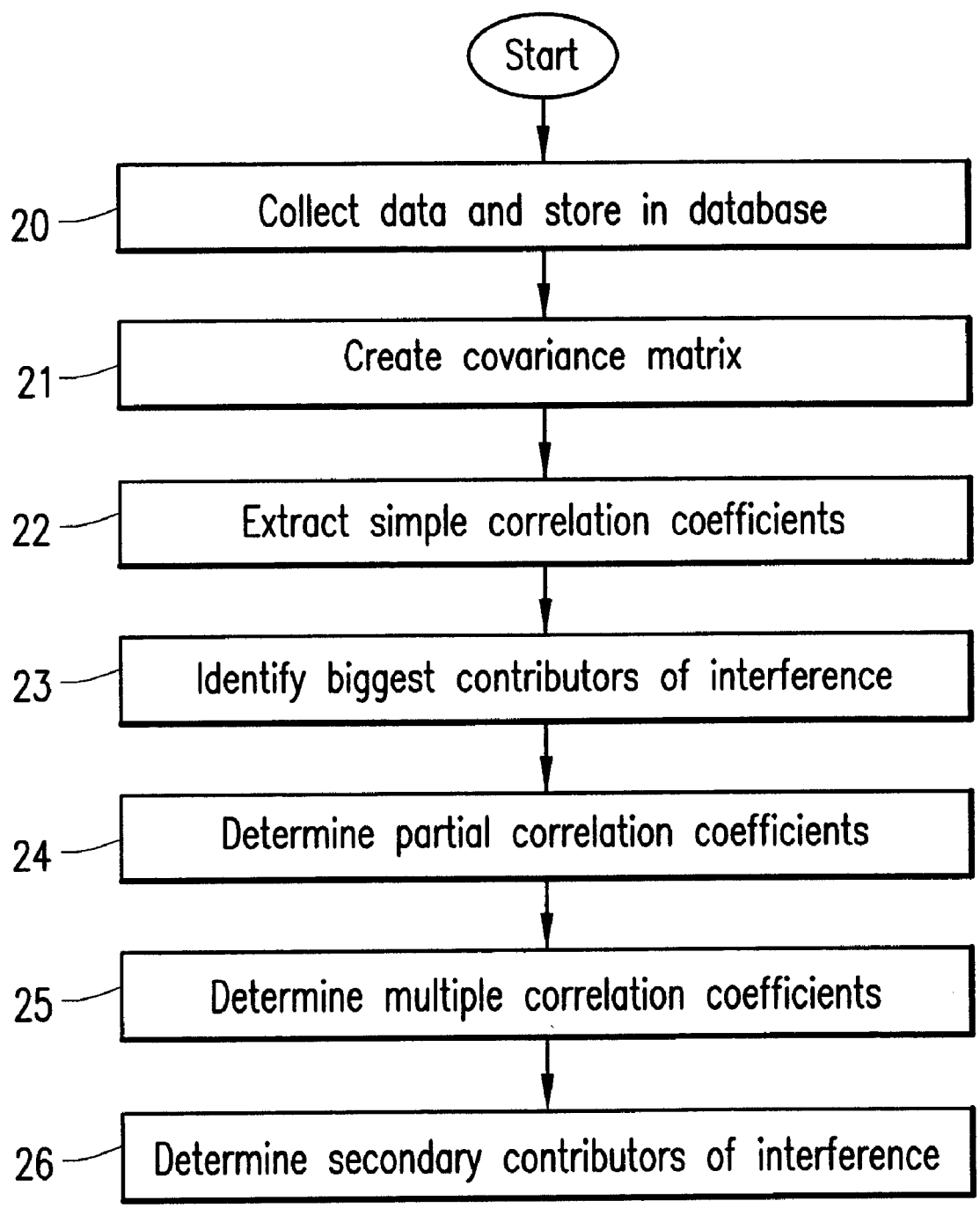
FIG. 2 is a flow chart illustrating an operation of the embodiment shown in FIG. 1.

The operation of telecommunications system 1 according to a preferred embodiment of the present invention will be described with reference to FIG. 2. For reasons of simplicity, the operation described below considers two candidate cells 2B, cells 2B1 and 2B2, as cells which potentially may interfere with the communication within disturbed cell 2A.

Assuming that the duration of the sampling interval and the duration of the time period during which the sampling intervals occur are determined, measurements are taken and data collected during step 20. During each sampling interval, the interference level in disturbed cell 2A and the traffic level in each of the candidate cells 2B are measured a number of times. For interference with uplink communication, data collecting devices 3A perform the measurements. For downlink interference, data collecting devices 4A of mobile stations 4 within disturbed cell 2A performs the interference measurement. In a preferred embodiment of the present invention, data collecting devices 3A and/or 4A determine the average measured level (interference level) for disturbed cell 2A. The traffic level for candidate cells 2B for each sampling interval may be determined by data collected by the base station or other device. The average interference level (or other characterization of interference level) and the average traffic level for each sampling period is stored in database 7. The data measuring, averaging (or characterizing) and storing are repeated for each sampling interval.

Figure 3:
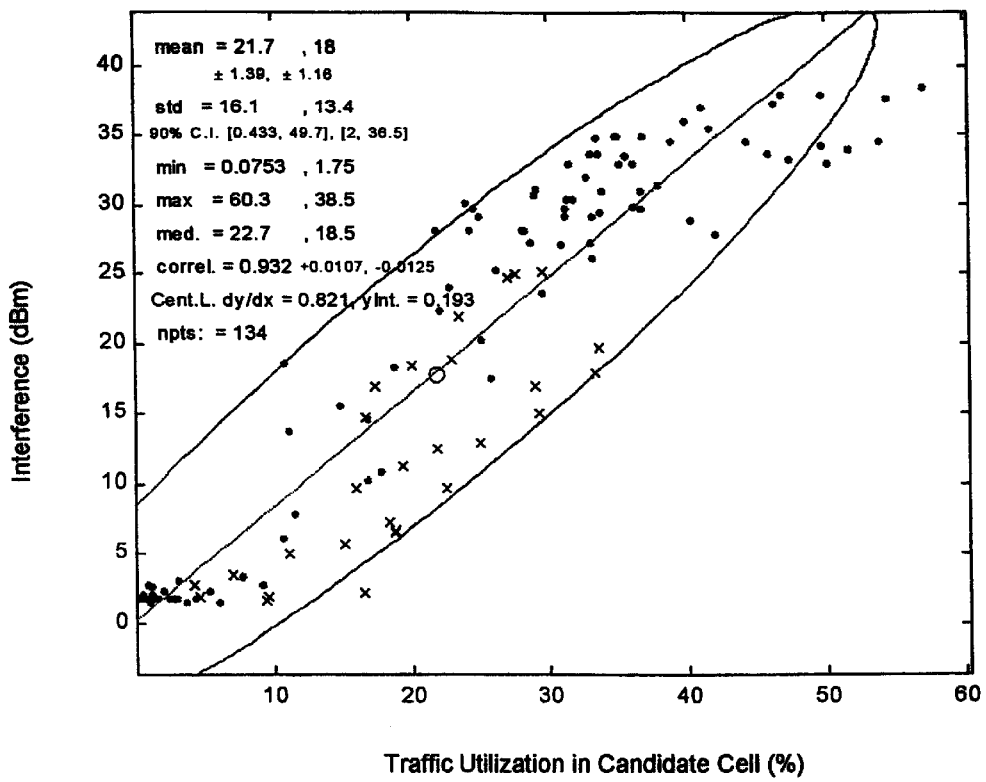
FIGS. 3 and 4 illustrate correlation plots between variables measured by the embodiment of FIG. 1.
Figure 4:
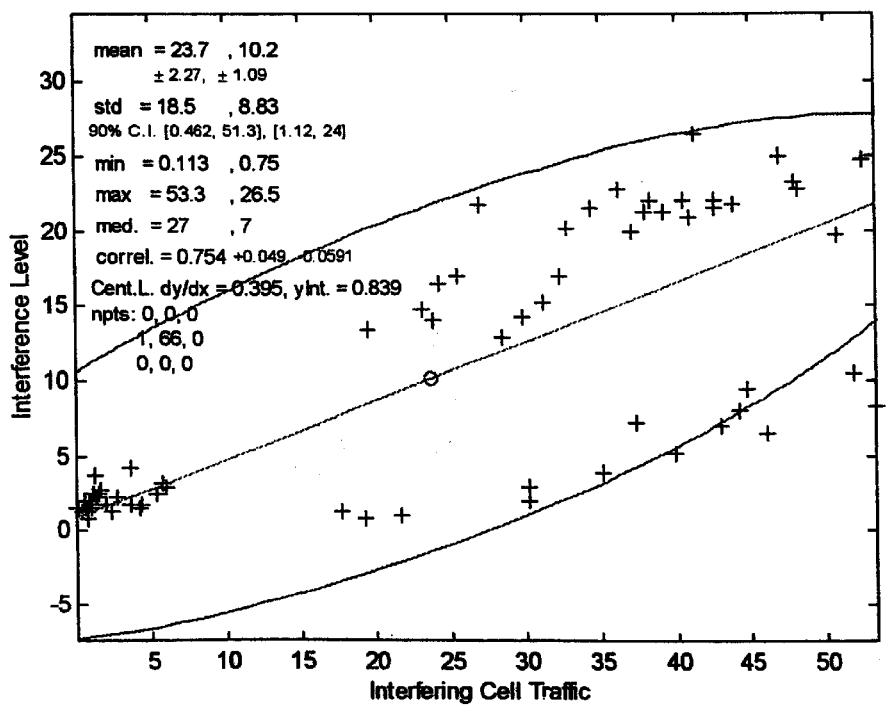

At this point, it is understood that correlation plots may be generated and possibly utilized in analyzing the collected data. For instance, FIG. 3 illustrates the correlation between traffic use in candidate cell 2B1 and interference within disturbed cell 2A, and FIG. 4 illustrates the correlation between traffic use in candidate cell 2B2 and interference within disturbed cell 2A.

Next, processing element 6, using statistical software associated therewith, generates a covariance matrix at step 21 based upon the data collected and stored in step 20. In the present example in which there are two candidate cells 2B, the covariance matrix is a 3×3 matrix. The covariance matrix in this case appears as follows:

$$\text{Covariance Matrix} = \begin{pmatrix} \sigma_I^2 & \rho_{I2B1}\sigma_I\sigma_{2B1} & \rho_{I2B2}\sigma_I\sigma_{2B2} \\ \rho_{I2B1}\sigma_I\sigma_{2B1} & \sigma_{2B1}^2 & \rho_{2B}\sigma_{2B1}\sigma_{2B2} \\ \rho_{I2B2}\sigma_I\sigma_{2B2} & \rho_{2B}\sigma_{2B1}\sigma_{2B2} & \sigma_{2B2}^2 \end{pmatrix}$$

where $\sigma_I^2$ is the variance of the interference levels collected from disturbed cell 2A (with the square root thereof being its standard deviation), $\sigma_{2B1}^2$ is the variance of the average traffic levels measured in candidate cell 2B1 (with the square root thereof being its standard deviation), $\sigma_{2B2}^2$ is the variance of the average traffic levels collected in candidate cell 2B2 (with the square root thereof being its standard deviation), $\rho_{I2B1}$ is the simple correlation coefficient of the collected interference in disturbed cell 2A and the collected traffic level in candidate cell 2B1, $\rho_{I2B2}$ is the simple correlation coefficient of the collected interference in disturbed cell 2A and the collected traffic level in candidate cell 2B2, and $\rho_{2B}$ is the simple correlation coefficient of the collected traffic level in candidate cell 2B1 and the collected traffic level in candidate cell 2B2. The covariance matrix is created from the data collected during step 20 using data reduction to calculate the matrix elements from the full set of data collected.

For example, the matrix element $\rho_{2B}\sigma_{2B1}\sigma_{2B2}$ is calculated from the collected data using the following equation:

$$\rho_{2B}\sigma_{2B1}\sigma_{2B2} = (1/N)\Sigma(\tau_{2B1}-\mu_{2B1})*(\tau_{2B2}-\mu_{2B2}),$$

where $\tau_{2B1}$ is the collected traffic level in candidate cell 2B1 in one sampling interval, $\mu_{2B1}$ is the average of $\tau_{2B1}$, $\tau_{2B2}$ is the collected traffic level in candidate cell 2B2 in the same sampling interval, and $\mu_{2B2}$ is the average of $\tau_{2B2}$. The summation is over all the sampling intervals.

Covariance matrices are known in the mathematical art and will not be explained in detail herein.

Once the covariance matrix is created, the simple correlation coefficients are determined at step 22. The calculation of the simple correlation coefficients from the covariance matrix is performed in a straightforward manner as in known in the mathematical art.

At this point, by examining the simple correlation coefficients, the candidate cell 2B which provides the greatest amount of interference to disturbed cell 2A can be determined at step 23. If $\rho_{I2B1} > \rho_{I2B2}$, then candidate cell 2B, is the candidate cell which contributes the most interference. Alternatively, if $\rho_{I2B2} > \rho_{I2B1}$, then candidate cell 2B2 is the candidate cell which contributes the most interference. In general, the candidate cell 2B with the greatest correlation coefficient between its traffic levels and the interference in disturbed cell 2A is the primary interfering cell.

Next, partial correlation coefficients $\rho_{partial}$ are determined at step 24. For each candidate cell 2B, processing element 6 determines the partial correlation coefficient $\rho_{partial}$ between the collected interference and the collected traffic level in the candidate cell 2B with the traffic level in the other candidate cell 2B being assumed constant. Processing element 6 then determines at step 25 the multiple correlation coefficient $\rho_{multiple}$ between the collected interference in disturbed cell 2A and the cumulative effect of the collected traffic use in the candidate cells 2B. Processing element 6 identifies at step 26 the candidate cell(s) 2B which contribute to co-channel interference within disturbed cell 2A based the partial correlation coefficients $\rho_{partial}$ and the multiple correlation coefficient $\rho_{multiple}$, as well as determines the extent of the interference contribution by each candidate cell 2B.

In particular, for each candidate cell 2B, the partial correlation coefficient corresponding thereto indicates whether candidate cell 2B is an interfering cell or a non-interfering cell having a relatively high correlation between interference within disturbed cell 2A and traffic use in the candidate cell 2B. The multiple correlation coefficient may be used to indicate whether or not there are a number of interfering candidate cells 2B. For instance, if the partial correlation coefficient for a candidate cell is substantially the same as the multiple correlation coefficient, then the corresponding candidate cell is the only interfering cell causing interference within disturbed cell 2A. If the partial correlation coefficient for an interfering candidate cell 2B is substantially less than the multiple correlation coefficient, then other candidate cells 2B are significant contributors to interference in addition to the interfering candidate cell 2B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of identifying a source of interference associated with a selected cell in a mobile telecommunications network, comprising the steps of:

identifying candidate cells in the mobile telecommunications network, at least one of which is a source of interference within the selected cell;

measuring interference levels within the selected cell during predetermined sampling intervals and storing at least one interference level for each sampling interval in memory;

measuring traffic levels within candidate cells during the predetermined sampling intervals and, for each candidate cell, storing at least one traffic level for each sampling interval in memory;

for each candidate cell, determining a partial correlation coefficient between the stored interference levels and the stored traffic levels for the candidate cell; and identifying one or more interfering candidate cells that cause the interference within the selected cell, based upon the determined partial correlation coefficients.

2. The method of claim 1, wherein:

said step of identifying candidate cells identifies cells in the mobile telecommunications network within which information is communicated at a frequency that is the same as the frequency at which information within the selected cell is communicated.

3. The method of claim 1, further comprising the step of:

determining the multiple correlation coefficient between the stored interference levels and the stored traffic levels corresponding to all of the candidate cells.

4. The method of claim 3, wherein:

said step of identifying the one or more interfering candidate cells identifies the one or more interfering candidate cells based upon the determined multiple correlation coefficient.

5. The method of claim 1, further comprising the step of:

identifying the candidate cell that provides the most interference within the selected cell.

6. The method of claim 5, wherein said step of identifying the candidate cell providing the most interference comprises the steps of:

for each candidate cell, determining a simple correlation coefficient between the stored interference levels and the stored traffic levels for the candidate cell; and identifying the candidate cell associated with the greatest simple correlation coefficient as the candidate that provides the most interference within the selected cell.

7. The method of claim 1, wherein the step of determining a partial correlation coefficient for each candidate cell comprises the step of:

creating a covariance matrix based upon the stored interference levels and the stored traffic levels.

8. In a mobile cellular telecommunications system, an apparatus for identifying a source of interference associated with a selected cell from one or more candidate cells, comprising:

a memory device;

a plurality of data collecting devices for measuring interference levels within the selected cell during predetermined sampling intervals and storing at least one interference level for each sampling interval in said memory device, and for measuring traffic levels within said candidate cells during the predetermined sampling intervals and storing at least one traffic level of each candidate cell for each sampling interval in said memory device; and a processing element, in communication with said memory device, for determining, for each said candidate cell, a partial correlation coefficient between the stored interference levels and the stored traffic levels for the candidate cell, and for identifying one or more interfering candidate cells that cause the most interference within the selected cell, based upon the determined partial correlation coefficients.

9. The apparatus of claim 8, wherein:

for each candidate cell, said processing element determines a simple correlation coefficient between the stored interference levels and the stored traffic levels for the candidate cell, and identifies the candidate cell that provides the most interference to the selected cell based upon the simple correlation coefficients.

10. The apparatus of claim 9, wherein:

said processing element identifies the candidate cell associated with the greatest simple correlation coefficient as the candidate cell that provides the most interference to the selected cell.

11. The apparatus of claim 8, wherein:

said processing element determines a multiple correlation coefficient between the stored interference levels and the stored traffic levels, and identifies said one or more interfering candidate cells based upon the multiple correlation coefficient.

12. A method of identifying a source of interference associated with a selected cell in a mobile telecommunications network, comprising the steps of:

identifying candidate cells in the mobile telecommunications network, at least one of which is a source of interference within the selected cell;

measuring interference levels within the selected cell during predetermined sampling intervals and storing at least one interference level for each sampling interval in memory;

measuring traffic levels within candidate cells during the predetermined sampling intervals and, for each candidate cell, storing at least one traffic level for each sampling interval in memory;

for each candidate cell, determining a correlation coefficient between the stored interference levels and the stored traffic levels for the candidate cell; and identifying the candidate cell that causes the greatest amount of interference within the selected cell, based upon the determined correlation coefficients.

13. The method of claim 12, wherein:

said step of determining a correlation coefficient comprises the step of determining, for each candidate cell, a simple correlation coefficient correlating the stored interference levels and the stored traffic levels for the candidate cell.

14. The method of claim 12, wherein:

said step of determining a correlation coefficient comprises the step of determining, for each candidate cell, a partial correlation coefficient correlating the stored interference levels and the stored traffic levels for the candidate cell; and said method further comprises the step of identifying other candidate cells that cause interference within the disturbed cell, based upon the determined partial correlation coefficients.

* * * * *